United States Patent

Eisele

[15] 3,689,812
[45] Sept. 5, 1972

[54] GENERATOR-FED MOTOR CONTROL WITH DYNAMIC BRAKING FOR VEHICLE PROPULSION

[72] Inventor: Max Eisele, Widerlichstr. 12, Erlangen, Germany

[73] Assignee: Siemens Aktiengesellschaft

[22] Filed: Feb. 11, 1971

[21] Appl. No.: 114,594

[30] Foreign Application Priority Data

Feb. 14, 1970 Germany..........P 20 06 801.3

[52] U.S. Cl. ..................318/151, 318/152, 318/154, 318/380
[51] Int. Cl. ............................................H02p 5/26
[58] Field of Search......318/151, 152, 148, 153, 154, 318/380

[56] References Cited

UNITED STATES PATENTS 2,420,873   5/1947   Formhals et al. ..........318/154

Primary Examiner—T. E. Lynch
Attorney—Curt M. Avery, Arthur E. Wilfond, Herbert L. Lerner and Daniel J. Tick

[57] ABSTRACT

In a variable voltage drive of the Ward Leonard type the excitation of the generator is discontinued for braking and the armature of the generator and the armature of the drive motor are connected to a brake resistor. As a result, a braking effect occurs without delay and the voltage of the generator decays quickly to a value which is required for the connection to the excitation winding of the drive motor.

3 Claims, 2 Drawing Figures

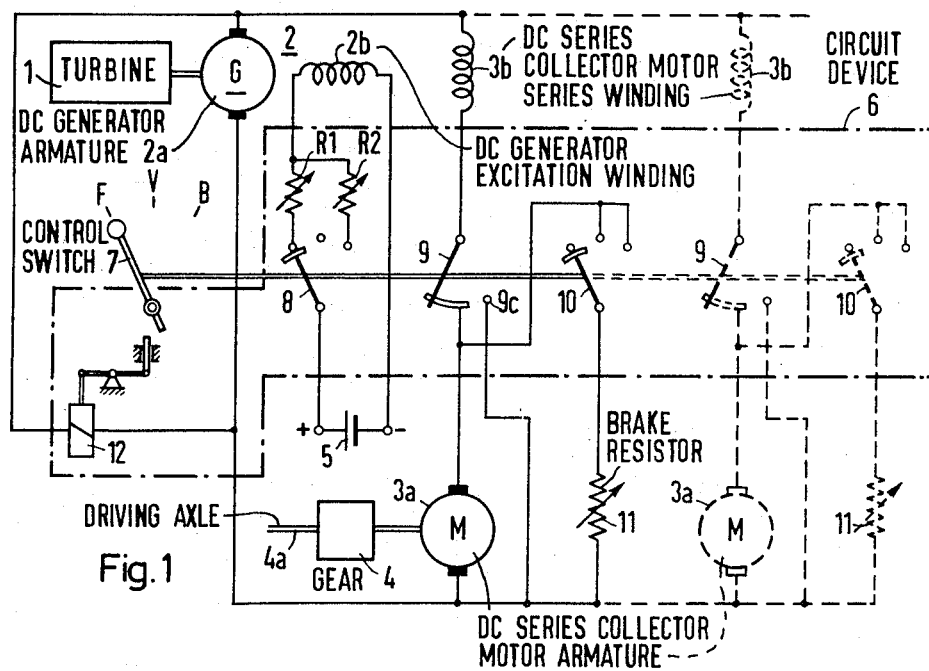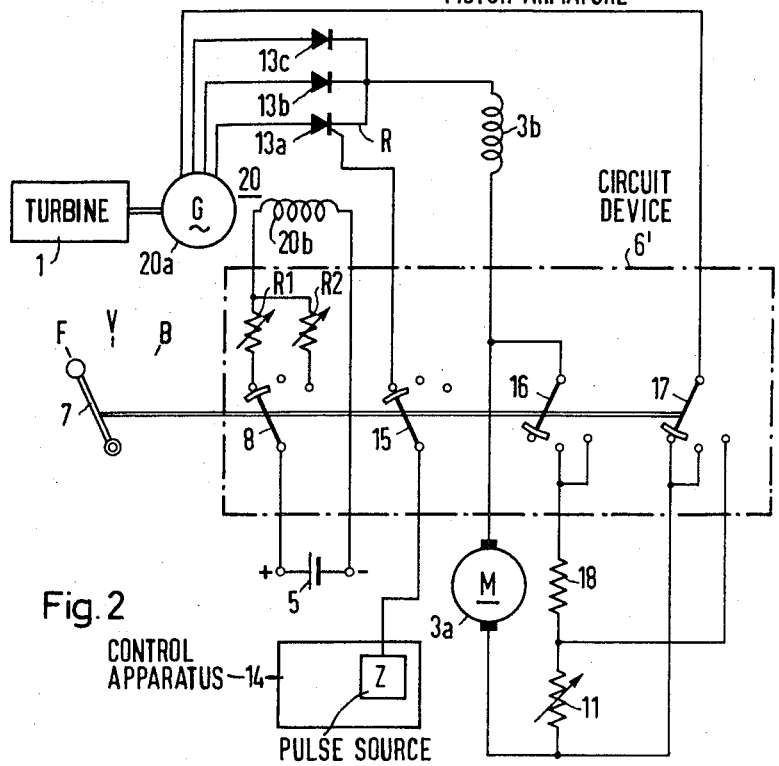

GENERATOR-FED MOTOR CONTROL WITH DYNAMIC BRAKING FOR VEHICLE PROPULSION

DESCRIPTION OF THE INVENTION

My invention relates to an electric drive particularly a variable voltage (Ward Leonard) drive for the propulsion of vehicles. In such drives at least one drive motor is energized by a generator. The armature of the drive motor is connectable or switchable for braking operations to a brake resistor or the like. The generator may be driven, for example, by a Diesel or other compression engine.

In known drives of the type of the invention, series machines are used whose torque and speed is controlled by changing the excitation of a generator. During braking operation, the series machines operate as generators, and following their separation from the generator, the armatures of these machines are switched onto braking resistors. The generator then serves to energize the excitation winding of the series machines. The resistance of the excitation winding of the series machines is very small. Therefore, the generator requires a considerably lower voltage during braking than during driving, to safeguard the necessary excitation current for the series machines. Hence, when a transition from driving operation to braking operation is required, a certain time has to elapse following the drop in generator excitation, until the generator voltage is cut off. The braking switching or control can be effected only when the generator voltage has dropped to the voltage which is feasible or permissible during braking operation. In the interim, braking cannot be effected. Similar conditions may prevail in separately or externally excited DC machines.

It is an object of the invention to shorten the period of time expended in producing brake switching, by simple means and to obtain a braking effect during said period. In a drive of the aforementioned type, this becomes possible because if the generator is designed as a DC generator, the switching device comprises switching components connected in such a manner that during the transition to braking operations, the excitation of the DC generator is cut off and, simultaneously, the armature of the drive motor is connected to a brake resistor or resistance, maintaining at the same time the connection of the drive motor and the generator. Upon the voltage for energizing the excitation winding of the drive motor reaching a predetermined magnitude, the excitation of the DC generator is continued at a reduced level. In this manner, there is a braking effect without delay, and the remanence voltage of the generator decreases with in a short time to the voltage required in braking operations, due to the connection of the braking resistor or resistance. The switching of the brake may be rapidly established.

An AC generator may be utilized instead of a DC generator in an electric drive. The AC generator may then be connected, in accordance with the principle of the invention, to a motor, if necessary via electronic switches or electric valves. In this instance, the generator voltage may additionally be very rapidly reduced or cut off during the transition to braking operations, by discontinuing the excitation of the AC generator or by also disconnecting a circuit pole of the AC generator or disconnecting an electronic switch control unit from one of the electronic switches, and simultaneously connecting the armature of the drive motor to a braking resistor or resistance. Upon the voltage for energizing the excitation winding of the drive motor reaching a predetermined magnitude, the excitation of the AC generator is continued at a reduced level.

In order that the invention may be readily carried into effect, it will now be described with reference to the accompanying drawings, wherein:

FIG. 1 is a schematic circuit diagram of an embodiment of the electric drive of the invention utilizing a DC generator to energize a DC series motor as a drive motor; and FIG. 2 is a schematic circuit diagram of another embodiment of the electric drive of the invention utilizing an AC generator coupled to a drive motor via a plurality of electronic switches.

In the figures, the same components are identified by the same reference numerals.

In FIG. 1 a DC generator 2 is in force-locking connection with and driven by a turbine 1. The DC generator 2 has an armature 2a and energizes a DC series collector motor having an armature 3a and a series excitation winding 3b. The shaft of the collector motor is connected via a gear 4 to a driving axle 4a of a vehicle, or to a rotating mass. The speed and the torque of the collector motor are controlled via the excitation of the generator 2. To accomplish this the excitation winding 2b of the generator 2 is connected to a DC voltage source 5 via a variable resistor or resistance R1.

In order to be able not only to drive, but to brake as well, with the collector motor, the drive control or switching is transferred or changed to an externally excited resistance brake switching or control wherein the generator 2 is used to excite the collector or drive motor. The required circuit connections are produced by a circuit device 6 having with a control switch 7 switching components 8, 9 and 10. During driving, the position of the control switch 7 is that shown in FIGS. 1 and 2 as position F. When the control switch 7 is in position F, the excitation winding 2b of the generator 2 is connected to the DC voltage source 5 via a variable resistor or resistance R1 and the switching component 8.

The switching component 9 of the circuit device 6 is situated between the series excitation winding 3b of the drive motor and the armature 3a of said motor. In the electric drive of the invention, the circuit device is designed so that during the transition to braking operation, the switchover of the control switch 7 to the position V, causes the switching component 8 to open the circuit of the DC generator 2 to discontinue the excitation of said generator. Simultaneously, the switching component 10 switches the armature 3a of the collector or drive motor to a brake or braking resistor or resistance 11. Simultaneously, by maintaining the connection between the drive motor 3 and the generator 2, the braking resistance 11 is connected at the same time to the armature 2a of said generator, via the switching component 10. Hence, the collector or drive motor 3 acts together with the generator 2 in generator operation, on the braking resistance.

When the generator 2, which is no longer connected to its excitation voltage is loaded, the voltage of said generator will also decay rapidly. As soon as the voltage required for braking is obtained, the control lever 7 is released through a voltage relay 12 connected to the armature voltage of the generator 2, for further switching to a braking position B. When the control switch 7 is guided to the braking position B, which may be accomplished manually or by an automatic device, the final braking switch or connection is effected.

When the control switch 7 is in the position B, the excitation winding 2b of the generator 2 is connected to the voltage source 5 via the switching component 8 and a variable resistance or resistor R2, whose resistance value is increased with respect to resistance R1. Simultaneously, the switching component 9 and its contact 9c connect the excitation winding 3b of the drive motor to the armature 2a of the generator 2. At the same time, the switching component 9 disconnects the armature 3a of the drive motor from its field winding 3b and the switching component 10 maintains the connection of said armature to the variable brake resistor or resistance 11. The braking torque may be controlled via the variable resistance R2 in the excitation circuit of the generator, or by varying the brake resistance 11.

FIG. 2 shows that the generator may also be designed as an AC generator 20. In the embodiment of FIG. 2, a drive motor 3a, 3b is connected to the AC generator 20 via electronic switches or electric valves 13a, 13b and 13c. The rapid reduction of the generator voltage necessary for braking is preferably so effected or obtained that during the transition to braking operation a circuit pole R is simultaneously disconnected with the discontinuing of the excitation of the AC generator 20.

The circuit device 6' comprises the control switch 7, the switching component 8 and switching components 15, 16 and 17. An electronic switch 13a is connected in the circuit pole R. Preferably, at least the electronic switch or electric valve 13a, which corresponds to the circuit pole R, is controllable and its control electrode is connected to a pulse source Z of control apparatus 14 via the switching component 15 and may be disconnected from said pulse source via said switching component. The pulse source Z provides ignition pulses for the electronic switch 13a. When the control switch 7 is in the position V, the switching components 16 and 17 connect the armature 3a of the drive motor and the stator winding 20a of the generator 2 to the brake resistance 11.

The embodiment of FIG. 2 of the invention makes it possible to reduce the generator voltage to the voltage required for braking even more rapidly than does the embodiment of FIG. 1.

When the voltage for energizing the excitation winding 3b of the drive motor attains or reaches a predetermined magnitude the switching device 6' continues braking position B, the excitation of the AC generator 20 at a reduced level. This is accomplished in the braking position B of the control switch 7, via the switching component 8 and the variable resistor or resistance R2.

A compound resistance circuit, in which where the excitation current and the armature current flow through a so-called compound resistance in the same direction, during braking, functions as the braking circuit, connection or resistor. The sum of the voltage drops of both currents in the compound resistance 18, which connects are connected in opposition to the more or less constant excitation voltage of the AC generator 20, effects a change in the excitation current during each change of the armature current, and results in the braking force remaining about constant.

The braking circuit of the embodiment of FIG. 1, or any other suitable braking circuit, may be utilized instead of the compound resistance circuit of the embodiment of FIG. 2. In the braking circuit, after the predetermined voltage determined for energizing the excitation winding of the drive motor has been attained, said excitation winding is disconnected from the armature of said drive motor and is connected generator.

The circuit pole R may be disconnected at the onset of the braking or during the entire braking operation. If the circuit pole R is disconnected only at the beginning of the braking process, the braking effect may also be influenced during the braking operation by disconnecting said circuit pole.

While the invention has been described by means of specific examples and in specific embodiments, I do not wish to be limited thereto, for obvious modifications will occur to those skilled in the art without departing from the spirit and scope of the invention.

I claim:

1. A variable voltage drive for vehicle propulsion or the like, comprising a DC generator having an armature and an excitation circuit, at least one drive motor having an armature connected in series with said generator armature, brake circuit means and a switching device for selectively connecting said brake circuit for braking operation, said switching device comprising a plurality of switching components connected across said motor armature and in said excitation circuit of said generator, said generator excitation circuit being opened during transition from operation to braking to discontinue the excitation of the generator and simultaneously to switch the armature of the drive motor to the brake circuit and maintain the connection of the generator to the drive motor, and excitation circuit of the generator being reclosed by said device to continue the excitation of the generator at a reduced level upon the voltage for energizing the winding of the drive motor attaining a predetermined magnitude.

2. An electric drive for vehicles in which an AC generator having an excitation circuit energizes at least one drive motor via a plurality of electronic switches having a winding and an armature which may be switched by a switching device to a brake resistor or the like during switching operation and control means for controlling the conductivity condition of one of the electronic switches, said switching device comprising a plurality of switching components connected between the armature and the winding of the drive motor, in the excitation circuit of the generator, between the one of the electronic switches and the control means and between the armature of the generator and the brake resistor in a manner whereby in a transition form operation to braking the control means is disconnected from the one of the electronic switches the excitation circuit of the generator is opened to discontinue the excitation of the generator and simultaneously to switch the armature of the drive motor to the brake resistor and maintain the connection of the generator to the drive motor, and the excitation circuit of the generator is closed to continue the excitation of the generator at a reduced level upon the voltage for energizing the winding of the drive motor attaining a predetermined magnitude.

3. An electric drive for vehicles as claimed in claim 1, wherein the switching component of the switching device connected between the armature and the winding of the drive motor separates said winding from said armature and connects said winding to the generator when the voltage for energizing the winding of the drive motor attains said predetermined magnitude.

* * * * *